US007467327B2

(12) United States Patent
Del Vigna, Jr. et al.

(10) Patent No.: US 7,467,327 B2
(45) Date of Patent: *Dec. 16, 2008

(54) METHOD AND SYSTEM OF ALIGNING EXECUTION POINT OF DUPLICATE COPIES OF A USER PROGRAM BY EXCHANGING INFORMATION ABOUT INSTRUCTIONS EXECUTED

(75) Inventors: Paul Del Vigna, Jr., San Jose, CA (US); Robert L. Jardine, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 557 days.

This patent is subject to a terminal disclaimer.

(21) Appl. No.: 11/042,504

(22) Filed: Jan. 25, 2005

(65) Prior Publication Data

US 2006/0168425 A1 Jul. 27, 2006

(51) Int. Cl.
*G06F 11/00* (2006.01)
(52) U.S. Cl. .................... 714/12; 712/204; 712/209
(58) Field of Classification Search .............. 714/12; 712/204, 209
See application file for complete search history.

(56) References Cited

U.S. PATENT DOCUMENTS

| | | | | |
|---|---|---|---|---|
| 5,327,553 | A | * | 7/1994 | Jewett et al. ............ 714/3 |
| 5,384,906 | A | * | 1/1995 | Horst ..................... 713/375 |
| 5,600,784 | A | | 2/1997 | Bissett et al. |
| 5,615,403 | A | | 3/1997 | Bissett et al. |
| 5,751,955 | A | | 5/1998 | Sonnier et al. |
| 5,790,397 | A | | 8/1998 | Bissett et al. |
| 5,896,523 | A | | 4/1999 | Bissett et al. |
| 5,956,474 | A | | 9/1999 | Bissett et al. |
| 6,038,685 | A | | 3/2000 | Bissett et al. |
| 6,279,119 | B1 | | 8/2001 | Bissett et al. |
| 6,327,668 | B1 | | 12/2001 | Williams |

(Continued)

OTHER PUBLICATIONS

Microsoft Computer Dictionary, 4th Ed., 1999, Microsoft Press, p. 116.*

(Continued)

*Primary Examiner*—Christopher S McCarthy

(57) ABSTRACT

A method and system of aligning execution point of duplicate copies of a user program by exchanging information about instructions executed. At least some of the exemplary embodiments may be a method comprising operating duplicate copies of a user program in a first and second processor, allowing at least one of the user programs to execute until retired instruction counter values in each processor are substantially the same, and then executing a number of instructions of each user program. Of the instructions executed, at least some of the instructions are decoded and the inputs of each decoded instruction determined (the decoding substantially simultaneously with executing in each processor). The method further comprises exchanging among the processors addresses of decoded instructions and values indicative of inputs of the decoded instructions, determining that an execution point of the user program in the first processor lags with respect to an execution point of the user program in the second processor using at least the addresses of the decoded instructions, and advancing the first processor until the execution point within each user program is substantially aligned.

25 Claims, 8 Drawing Sheets

U.S. PATENT DOCUMENTS

| | | | |
|---|---|---|---|
| 6,393,582 B1 | 5/2002 | Klecka et al. | |
| 6,473,869 B2 | 10/2002 | Bissett et al. | |
| 6,604,177 B1 | 8/2003 | Kondo et al. | |
| 6,862,693 B2 * | 3/2005 | Chaudhry et al. | 714/11 |
| 7,260,495 B2 * | 8/2007 | Gupta et al. | 702/121 |
| 2006/0107106 A1 * | 5/2006 | Michaelis et al. | 714/11 |
| 2007/0294574 A1 * | 12/2007 | Tai | 714/11 |

OTHER PUBLICATIONS

Microsoft Computer Dictionary, 4th Ed. Microsoft Press, 1999, p. 17.*

* cited by examiner

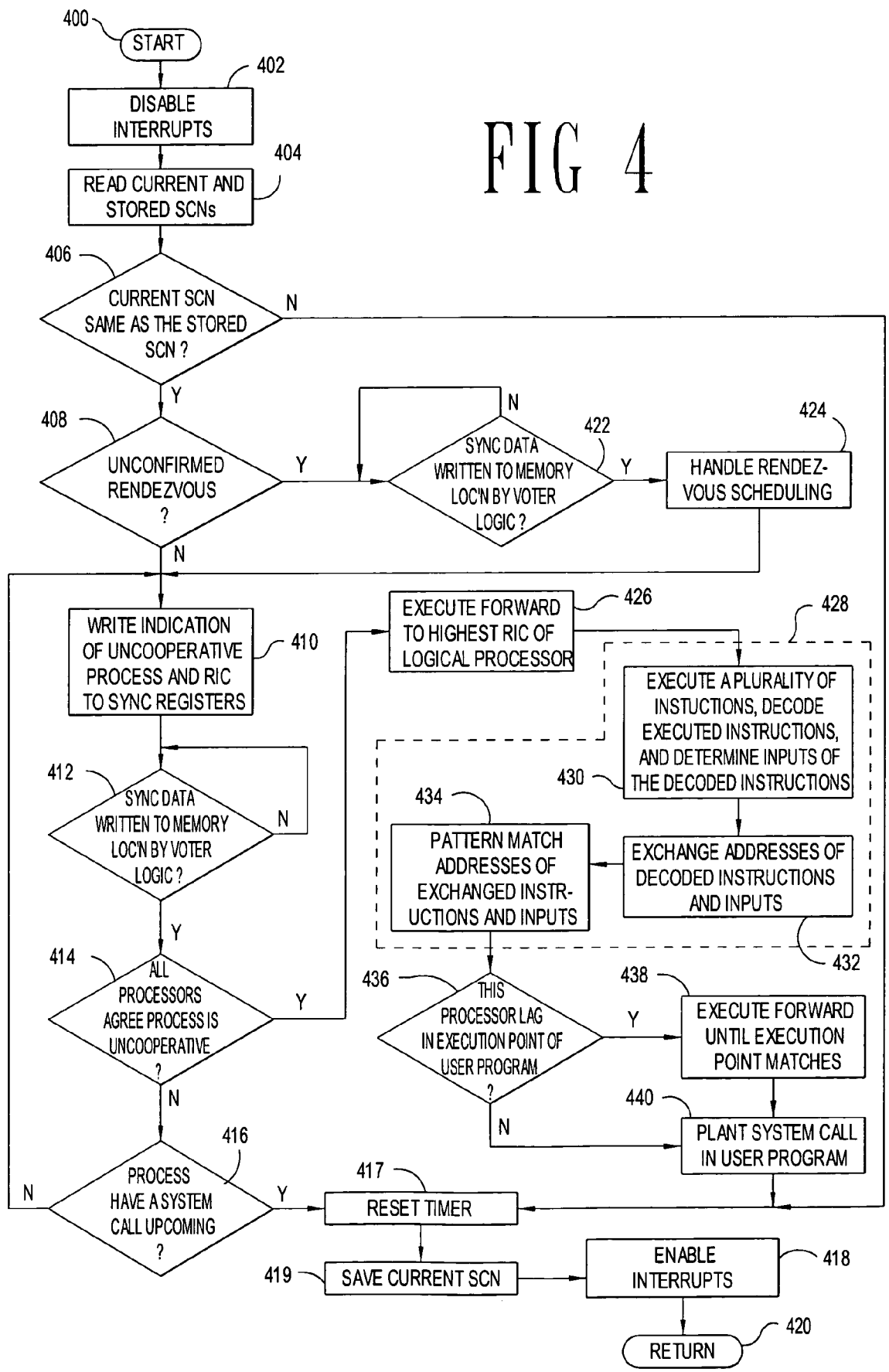

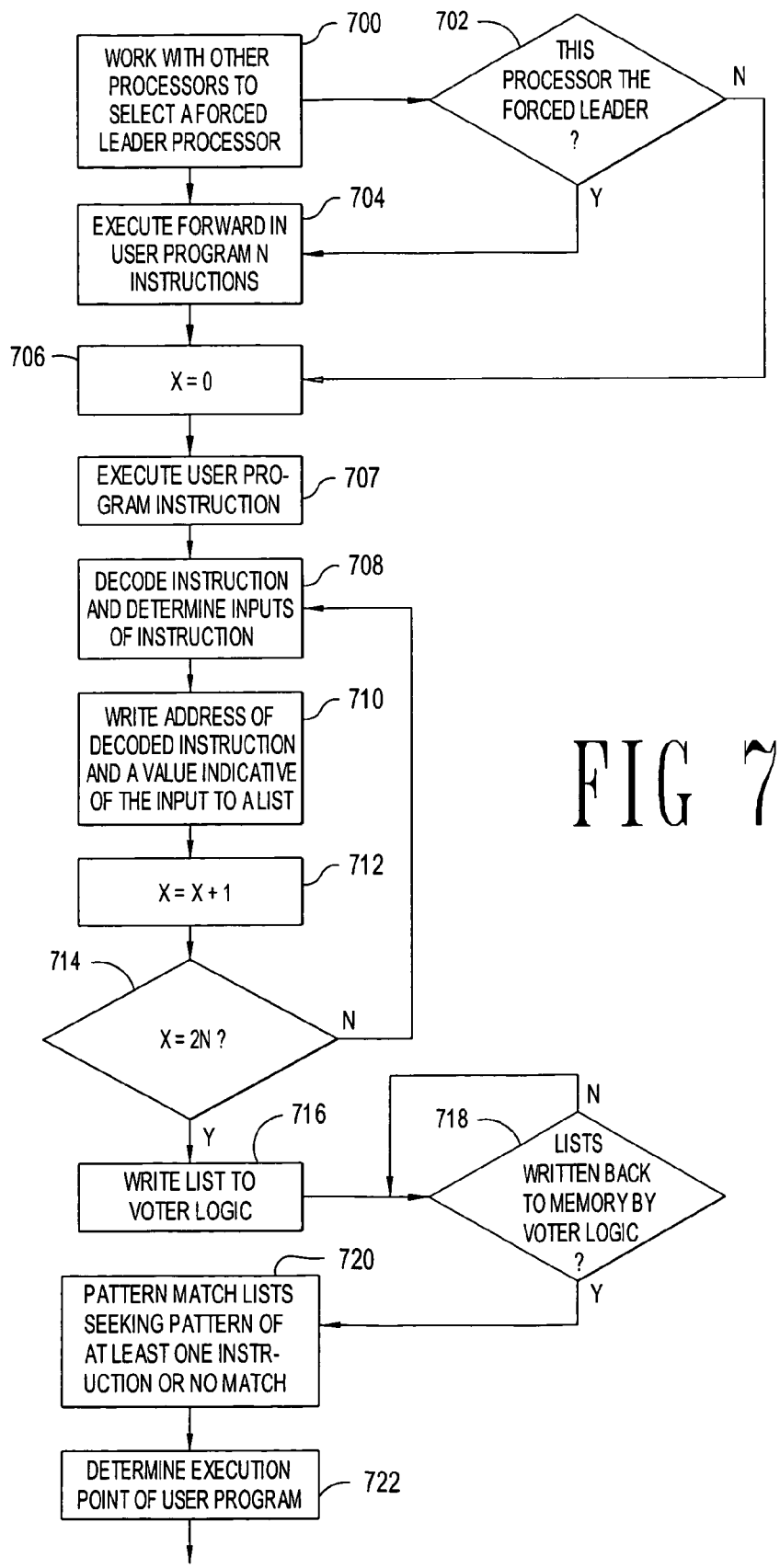

METHOD AND SYSTEM OF ALIGNING EXECUTION POINT OF DUPLICATE COPIES OF A USER PROGRAM BY EXCHANGING INFORMATION ABOUT INSTRUCTIONS EXECUTED

CROSS-REFERENCE TO RELATED APPLICATIONS

This application is related to co-pending U.S. Patent Application No. 11/042,981 (HP Ref. 200402489-1 (CR Ref. 2162-30600)) titled, "Method and System of Determining Whether An Application Program Has Made A System Level Call," which is incorporated by reference herein as if reproduced in full below. This application is also related to co-pending U.S. Patent Application No. 11/042,427 (HP Ref. 2000406269-1 (CR Ref. 2162-35000)) titled, "Method and System of Aligning Execution Point of Duplicate Copies of a User Program by Copying Memory Stores," which is also incorporated by reference herein as if reproduced in full below.

BACKGROUND

Loosely lock-stepped processors are processors executing duplicate copies of a user program, but the processors need neither execute their respective copies of the user program in a step-for-step fashion nor at the same wall clock time. Loosely lock-stepped processors may be used to detect and correct computational faults, such as caused by cosmic radiation, and also may be used to ensure the user program continues to operate in spite of a hardware failure.

Because of slight differences in clocking frequency, or correctable soft errors experienced in one processor but not others, one processor may lead in its execution point within the user program, and it is difficult to determine whether a user program in a processor leads or lags. A comparison of program counters or instruction pointers may not adequately identify a user program's execution point inasmuch all the user programs may be in the same software loop, but at different iterations of the loop, and yet the instruction pointer may be the same. Further, some processors implement retired instruction counters in their performance monitoring unit that attempt to increment on each retired instruction. A comparison of retired instruction counter values may be insufficient inasmuch as retired instruction counters are included for performance monitoring purposes, and do not necessarily correctly count each and every retired instruction. For example, some processors have the ability to cease loading of new instructions once the retired instruction counter reaches a particular value; however, a pipelined processor may have several instructions still in the pipeline that complete and that are not counted by the retired instruction counter, known as a sliding stop. Moreover, processor manufacturers do not guarantee that their retired instruction counters are one hundred percent accurate.

BRIEF DESCRIPTION OF THE DRAWINGS

For a detailed description of exemplary embodiments of the invention, reference will now be made to the accompanying drawings in which:

FIG. 4 illustrates an uncooperative process handler in accordance with embodiments of the invention;

FIG. 7 illustrates alternative embodiments of determining the execution point;

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure. In addition, one skilled in the art will understand that the following description has broad application, and the discussion of any embodiment is meant only to be exemplary of that embodiment, and not intended to intimate that the scope of the disclosure is limited to that embodiment.

Figure 1:
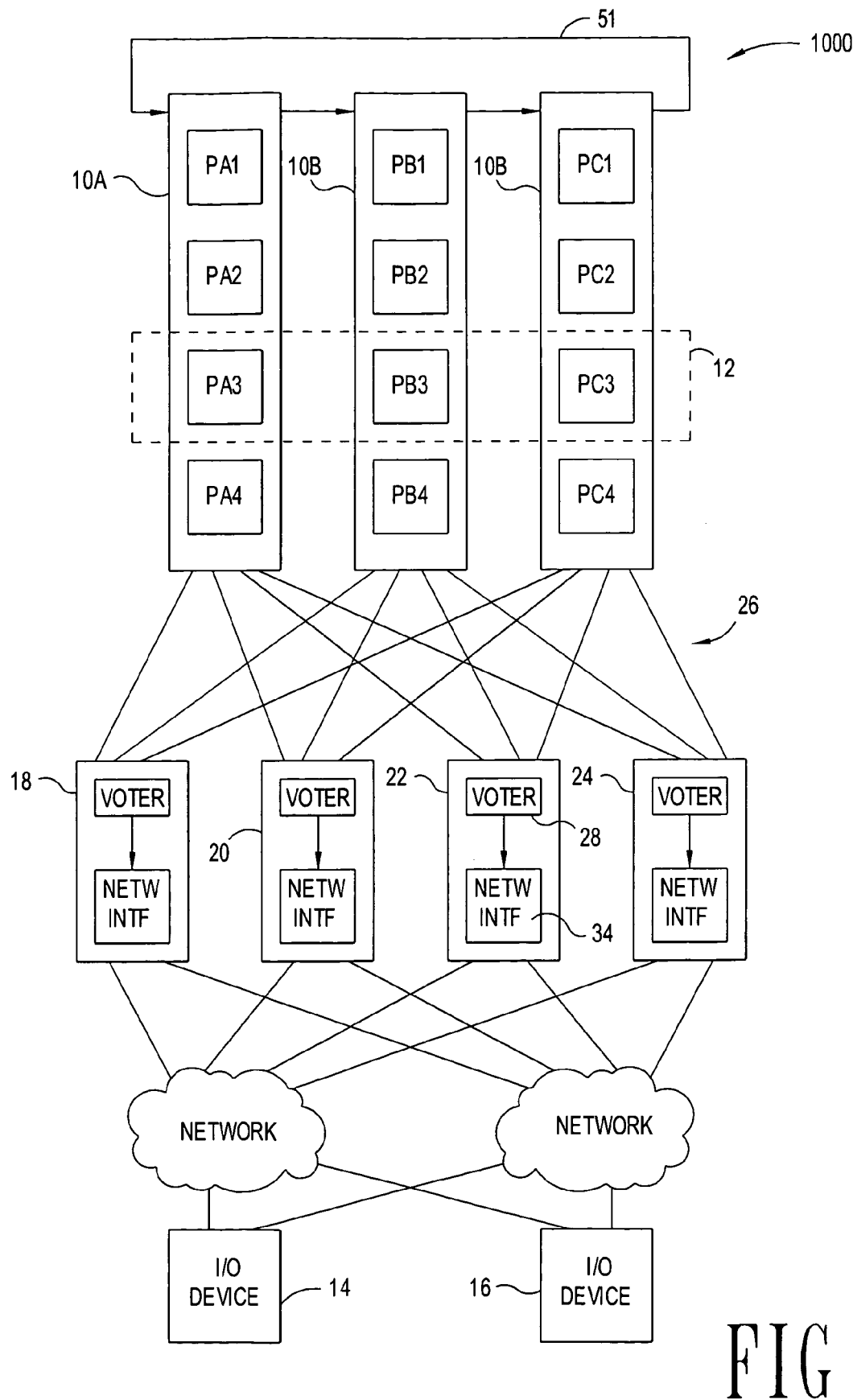
FIG. 1 illustrates a computing system in accordance with embodiments of the invention.

FIG. 1 illustrates a computing system 1000 in accordance with embodiments of the invention. In particular, the computing system 1000 comprises a plurality of multiprocessor computer systems 10. In some embodiments, only two multiprocessor computer systems 10 may be used, and as such the computing system 1000 may implement a dual-modular redundant (DMR) system. As illustrated in FIG. 1, the computing system 1000 comprises three multiprocessor computer systems 10, and therefore implements a tri-modular redundant (TMR) system. Regardless of whether the computer system is dual-modular redundant or tri-modular redundant, the computing system 1000 implements fault tolerance by redundantly executing user programs across the multiprocessor computer systems.

In accordance with embodiments of the invention, each multiprocessor computer system 10 preferably comprises one or more processors, and as illustrated in FIG. 1 four processors. Each processor of FIG. 1 has a leading "P," indicating a processor. Further, each processor is given a letter designation of "A," "B," or "C," to indicate the processor's physical location within one of the multiprocessor computer systems 10A, 10B and 10C respectively. Finally, each processor is given a numerical designation to indicate that processor's location within each multiprocessor computer system. Thus, for example, the processors in multiprocessor computer system 10A have designations "PA1," "PA2," "PA3," and "PA4."

In accordance with embodiments of the invention, at least one processor from each multiprocessor computer system 10 may be logically grouped to form a logical processor 12. In the exemplary embodiments illustrated in FIG. 1, processors PA3, PB3, and PC3 may be grouped to form the logical processor 12. In accordance with embodiments of the invention, each processor within a logical processor substantially simultaneously executes the duplicate copies of a user program, thus implementing fault tolerance. More particularly, each processor within a logical processor is provided the same instruction stream for the user program and computes the same results (assuming no errors), but the processors within the logical processor are not in cycle-by-cycle or strict lock-step; rather, the processors are loosely lock-stepped, with handling of interrupts occurring based on system calls (discussed below). In accordance with some embodiments, the processors may have non-deterministic execution, and thus strict lock-step may not be possible. In the event one of the processors fails, the one or more remaining processors may continue without affecting overall system performance.

Inasmuch as there may be two or more processors within a logical processor executing the same user programs, duplicate reads and writes may be generated, such as reads and writes to input/output (I/O) devices 14 and 16. The I/O devices 14 and 16 may be any suitable I/O devices, e.g., a network interface card, a floppy drive, a hard disk drive, a CD ROM drive and/or a keyboard. In order to compare the reads and writes for purposes of fault detection, each logical processor has associated therewith a synchronization logic. For example, processors PA1, PB1 and PC1 form a logical processor associated with synchronization logic 18. Likewise, the processors PA2, PB2 and PC2 form a logical processor associated with synchronization logic 20. The logical processor 12 is associated with synchronization logic 22. Finally, processors PA4, PB4 and PC4 form a logical processor associated with synchronization logic 24. Thus, each multiprocessor computer system 10 couples one each to each of the synchronization logics 18, 20, 22 and 24 by way of an interconnect 26. The interconnect 26 is a Peripheral Component Interconnected (PCI) bus, and in particular a serialized PCI bus, although other bus communication schemes may be equivalently used.

Each synchronization logic 18, 20, 22 and 24 comprises a voter logic unit, e.g., voter logic 28 of synchronization logic 22. The following discussion, while directed to voter logic 28 of synchronization logic 22, is equally applicable to each voter logic unit in each of the synchronization logics 18, 20, 22 and 24. The voter logic 28 acts to consolidate read and write requests from the processors, and plays a role in the exchange of information between processors, possibly for synchronization of the logical processors. Consider for purposes of explanation each processor in logical processor 12 executing its copy of a user program, and that each processor generates a read request to network interface 34. Each processor of logical processor 12 sends its read request to the voter logic 28. The voter logic 28 receives each read request, compares the read requests, and (assuming the read requests agree) issues a single read request to the network interface 34.

In response to the single read request issued by a synchronization logic, the illustrative network interface 34 returns the requested information to the voter logic 28. In turn, the voter logic replicates and passes the requested information to each of the processors of the logical processor. Likewise, for other input/output functions, such as writes and transfer of packet messages to other programs (possibly executing on other logical processors), the synchronization logic ensures that the requests match, and then forwards a single request to the appropriate location. In the event that any one processor in a logical processor does not function properly (e.g., fails to generate a request, fails to generate a request within a specified time, generates a non-matching request, or fails completely), the overall user program continues based on requests of the remaining processor or processors of the logical processor.

In addition to consolidating reads and writes to external interfaces (such as network interface 34), and duplicating data returned from those external interfaces, synchronization logics also play a role in ensuring each processor is provided the same time of day when a request for that information is made. In particular, user programs may at certain points in their execution make system calls requesting time of day information. A system call is any call to a privileged program (executed in a higher privileged mode than a user mode), such as operating system programs. A system call to obtain time of day information is only one example of the family of programs that fall within the category of system calls, and the role of system calls in handling interrupts will be discussed more fully below. In order that each user program is provided the same time of day at the same execution point in the user program (in spite of the differences in wall clock time when those execution points are reached), synchronization logics in accordance with embodiments of the invention provide the time of day information to each processor in a logical processor, rather than those processors deriving time internally.

Figure 2:
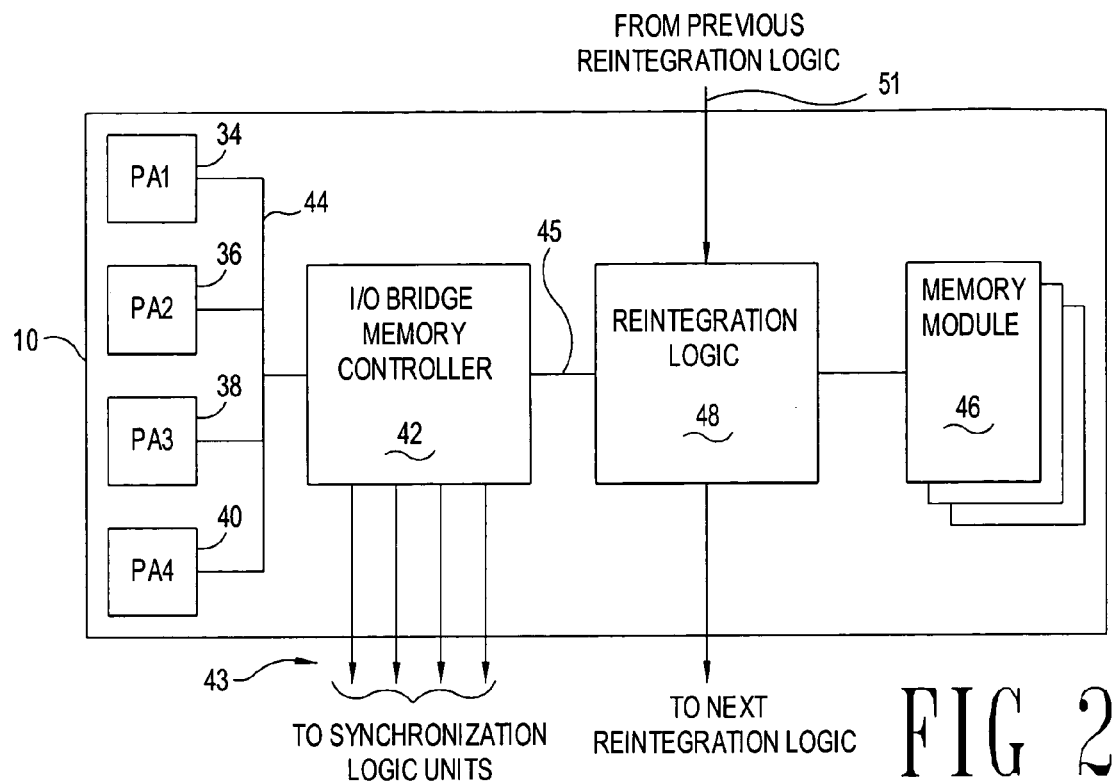
FIG. 2 illustrates in greater detail a computing system in accordance with embodiments of the invention.

FIG. 2 illustrates in greater detail a multiprocessor computer system 10. In particular, FIG. 2 illustrates that a multiprocessor computer system 10 in accordance with embodiments of the invention may have a plurality of processors, in the illustrative case of FIG. 2 four such processors 34, 36, 38 and 40. While only four processors are shown, any number of processors may be used without departing from the scope and spirit of the invention. The processors 34-40 may be individually packaged processors, processor packages comprising two or more processor dies within a single package, or multiple processors on a single die. Each of the processors may couple to an I/O bridge and memory controller 42 (hereinafter I/O bridge 42) by way of a processor bus 44. The I/O bridge 42 couples the processors 34-40 to one or more memory modules 46 by way of a memory bus 45. Thus, the I/O bridge 42 may control reads and writes to the memory area defined by the one or more memory modules 46. The I/O bridge 42 may also allow each of the processors 34-40 to couple to synchronization logics (not shown in FIG. 2), as illustrated by bus lines 43.

Still referring to FIG. 2, the memory defined by the one or more memory modules 46 may be partitioned, one partition for each processor, therefore allowing each of the processors to operate independently. In alternative embodiments, each processor may have its own integrated memory controller, and thus each processor may have its own dedicated memory, and this too would be within the contemplation of the invention. The processors 34-40 may also be non-deterministic processors not suitable for strict lock-step execution.

FIG. 2 further shows that each multiprocessor computer system 10 comprises a reintegration logic 48 coupled between the I/O bridge 42 and the memory modules 46. The illustrative embodiment of FIG. 1 show the interconnections of the reintegration logics (line 50) in the form of a ring, but any network topology may be equivalently used (e.g., ring, tree, dual rings, fully connected). In operation, the reintegration logic 48 is transparent to the I/O bridge 42, and does not interfere with reads and writes to the one or more memory modules 46. However, in the event that one processor within a logical processor experiences a fault and needs to be restarted, the reintegration logic 48 enables copying of at least the user program memory from another processor so that the formerly failed processor can begin at the same point as the non-failed processors in the logical processor.

In a loosely lock-stepped system, the reasons a processor may lead or lag may be many. For example, while each processor may execute instructions at substantially the same clock frequency, even minor differences in actual clock frequency may result in substantial differences over time. Moreover, processors implemented in accordance with at least some embodiments of the invention have non-deterministic execution, and thus even provided precisely the same user program the processors may diverge greatly in the number of executing steps to arrive at the same execution point in the user program. Further still, some processors could encounter data access delays and/or errors. Some examples may be: one processor may experience a cache miss that other processors may not experience; one processor may experience a correctable memory error, thus requiring executing of a recovery routine not needed by the remaining processors; and one processor may experience a miss of the translation look-aside buffer, causing additional processing but not affecting final outcome of the user program. Again, while the processors eventually arrive at the same execution point in the user program, the number of instructions executed and the time required to execute those instructions may not be the same.

With the idea in mind that processors of a logical processor may be executing the same instruction stream, but may not be at the same point in the instruction stream, the discussion turns to handling of interrupts in such an environment. Even if the same interrupt is asserted to each processor at precisely the same wall clock time, by virtue of the loosely lock-stepped execution of their respective processors the interrupts may not be asserted at the same execution point of the user program. The difficulty is further exacerbated by the fact that interrupt assertion itself is asynchronous. In order to ensure proper operation, each processor within a logical processor needs to service interrupts at the same execution point in the instruction stream of the user program. Ensuring interrupts are serviced at the same execution point in the instruction stream is accomplished in accordance with embodiments of the invention by utilizing the synchronization logic as a mechanism to agree on a rendezvous point at which to service the interrupt.

Figure 3:
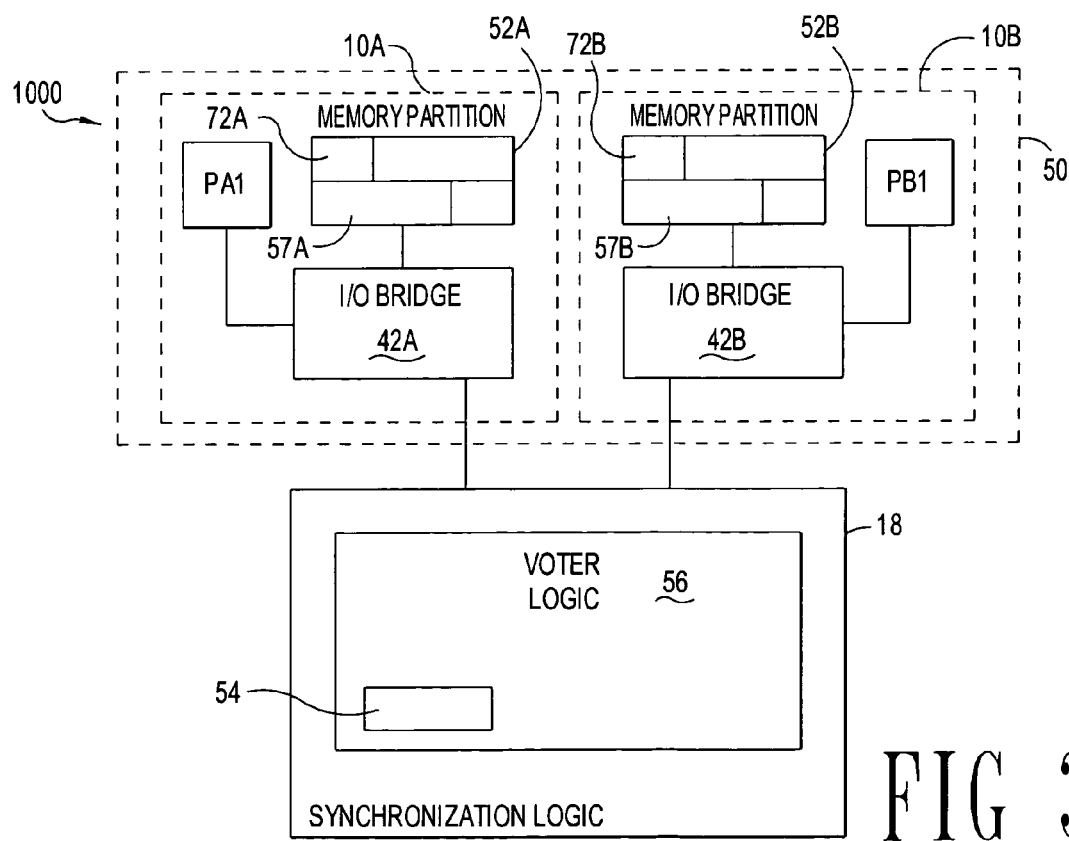
FIG. 3 illustrates a partial computing system in accordance with embodiments of the invention.

In accordance with embodiments of the invention, processors within a logical processor communicate with each other that: particular interrupts have been asserted; and a proposed point in the user program at which to suspend execution and to service the interrupt. Stated otherwise, processors in a logical processor agree on which interrupt to be serviced (or to be serviced first) and also agree on a point in the user program at which to service the interrupt. FIG. 3 illustrates a partial computing system 1000 in order to describe the operation of the various components that work together to coordinate servicing of interrupts. FIG. 3 is a simplified version of the system of FIG. 1 in the sense that the logical processor 50 in this case comprises only two processors PA1 and PB1. FIG. 3 is also, in another sense, more detailed than FIG. 1 inasmuch as FIG. 3 illustrates the memory partition 52 for each processor, and how the processor couples to the memory partition and the voter logic through the I/O bridge 42. Thus, the logical processor 50 of FIG. 3 comprises one processor each from the multiprocessor computer systems 10A and 10B. Processor PA1 couples to I/O bridge 42A, which in turn couples both to the synchronization logic 18 and PA1 processor's memory partition 52A. Processor PB1 couples to its respective I/O bridge 42B, which in turn couples to the synchronization logic 18 and PB1 processor's memory partition 52B.

In accordance with at least some embodiments, having the processors of a logical processor exchange information for purposes of establishing a rendezvous point at which to service an interrupt involves each processor writing information to synchronization registers 54 in the voter logic 56 of the synchronization logic 18. A rendezvous point, in accordance with embodiments of the invention, may be any suitable location, such as: each time a dispatcher function of the operating system executes and sets other tasks to execution; traps and fault handlers; and system calls made by user programs. However, it will be understood that the term system call is used generically in this specification to refer to any potential rendezvous point. A system call number may be a number which indicates how many system calls have been made from an arbitrary starting point. For example, location 72 of FIG. 3 illustrates a location in a memory partition 52 at which a system call number resides. In alternative embodiments, the system call number may be equivalently stored in a register located other than in the memory partition 52. In the embodiments illustrated in FIG. 3, the synchronization registers 54 are pre-designated memory locations, but any location where data may be written will suffice. After some or all of the processors have written their respective information, voter logic 56 writes the information in the synchronization registers 54 back to corresponding set of memory locations 57 in each of the memory partitions 52. Writing the information to the synchronization logic allows the processing of the user program to continue while waiting for the remaining processors to see the interrupt. By exchanging information the processors within a logical processor coordinate at what point in the user program to service an interrupt.

Interrupts may be asserted to a processor at any time by way of packet-based messages containing interrupt information, or by way of dedicated interrupt signal lines. Interrupts may also be asserted to a processor from an internal source, such as a timer that is set to expire after some number of processor clock cycles. When such a packet or internal interrupt is received and detected by the processor, the user program is suspended and an interrupt handler routine is invoked. The purpose of the interrupt handler routine is to begin the process of identifying the rendezvous point. No action is taken with respect to the services requested by the interrupt by the interrupt handler routine. System calls are the points at which the process of scheduling the rendezvous point is completed, and also the point at which scheduling programs to service the interrupts is made. For more information regarding scheduling of interrupts based on system calls, reference may be made to co-pending U.S. patent application no. (HP Ref. 200316143-1 (CR Ref. 2162-22100)) titled, "Method and System of Loosely Lock-Stepped Non-Deterministic Processors," which is incorporated by reference herein as if reproduced in full below.

Thus, coordinating servicing of interrupts is accomplished at system calls. However, there may be user programs that, for extended periods of time, do not make system calls. Therefore, it is possible that processors within a logical processor may significantly diverge with respect to the portion of a user program that they are executing, and/or further may not have ample opportunity to service interrupts. A user program that does not make system calls with sufficient frequency is called an "uncooperative process."

Handling of uncooperative processes in accordance with embodiments of the invention has several phases. The first phase is identification that a user program is indeed uncooperative. The second phase is identifying which processor(s) lag in execution point of the user program, and advancing the lagging processes. Finally, the last phase may be modifying the formerly uncooperative process. Each of these phases will be addressed in turn.

In some embodiments, identifying that a user program makes too few system calls, and is therefore considered uncooperative, involves the use of a timer. If the user program does not make a system call before the expiration of the timer, then the user program is an uncooperative process. In accordance with some embodiments of the invention, each time the dispatcher of a processor (operating in the highest privilege state—kernel mode) sets a user program to execution, the dispatcher also: resets the processor's retired instruction counter; sets the retired instruction counter to count only user (lowest level privilege) instructions; starts an uncooperative process timer; and stores an indication of the current system call number. The retired instruction counter is a counter implemented, for example, in the performance monitoring unit of most commercially available processors, The value of the retired instruction counter is incremented upon the completed execution of each user level instruction by the processor. With regard to the uncooperative process timer, Itanium® processors made by Intel® may be used to detect uncooperative processes by arming the Interval Time Counter (ITC) and the Interval Time Match (ITM) registers. The ITC is a free running counter that begins counting upon power-up of the processor. By "free running," it is meant that the ITC counts regardless of the number and/or types of instructions being executed, the ITC cannot be stopped by any instruction (regardless of privilege), and the value of the ITC cannot be changed by any user instruction. Starting the uncooperative process timer in these embodiments thus means reading the value of the ITC, and placing a value in the ITM that represents the value of the ITC when the desired amount of time has passed. When the value of the ITC and ITM registers are equal, an interval timer interrupt is asserted. Although the uncooperative process timer in these illustrative embodiments does not truly "expire," discussion of the value of the ITC matching the ITM from this point forward will be referred to as an "expiration of the timer" so as to generically apply to any timer-type system used as an uncooperative process timer. It is noted that if Itanium® processors are used, compiler inserted speculative instructions, e.g., a load.s and load.chk pair, are not permitted in user programs as these could significantly affect retired instruction count values. For processors that do not implement ITC/ITM type timing capability, a periodic timer interrupt may be used in combination with a register to track the number of interrupts, and to perform the uncooperative process related tasks after a predetermined number of periodic timer interrupts have occurred. Turning again to the uncooperative process timer generically, at the expiration of the timer, an interrupt is asserted which invokes an uncooperative process handler routine. The uncooperative process handler routine checks whether there has been at least one system call during the period of time defined by the timer, which in some embodiments may be on the order of 100 micro-seconds. The interrupt caused by the uncooperative timer expiration can be considered a different class of interrupt than other interrupts asserted during user program execution in that such interrupts are serviced immediately in each processor. By contrast, other interrupts asserted during user program execution are scheduled for servicing at rendezvous points. In alternative embodiments, system calls may reset the timer to avoid triggering of the uncooperative process handler routine, but these resets may require costly kernel mode process calls. The interrupts associated with the uncooperative processor timers are handled internal to each processor (indeed, if the user process is cooperative the fact that the uncooperative process timer has expired is not communicated to other processors), and thus may be considered a different type of interrupt than the interrupts that need coordinated servicing across the various processors of the logical processor, such as input/output requests.

FIG. 4 illustrates a flow diagram of the uncooperative process handler in accordance with embodiments of the invention. In particular, the uncooperative process handler starts (block 400) by the assertion of an interrupt after expiration of the uncooperative process timer. After disabling interrupts (block 402), which may be an explicit step or may be automatic on entering an interrupt handler, the uncooperative process handler reads the current system call number (e.g., from location 72 of FIG. 3) and the system call number stored by the dispatcher at initiation (block 404). The current system call number being the same as the system call number stored at initiation by the dispatcher (block 406) is indicative that the user program has failed to make a system call during the period of time defined by the uncooperative process timer, and is therefore an uncooperative process. If, on the other hand, the current system call number is not the same as the stored system call number (again block 406), the process is cooperative and therefore the illustrative method resets the uncooperative processor timer (block 417), saves the current system call number (block 419), enables interrupts (block 418) and returns (block 420).

In accordance with embodiments of the invention, a user program becoming uncooperative within at least one processor of a logical processor invokes an exchange of data with the other processors to determine if other processors in the logical processor agree to its uncooperative nature. Still referring to FIG. 4, if the current system call number is the same as the system call number stored by the dispatcher (block 406), the next step is a determination of whether there is an unconfirmed rendezvous operation (block 408) (discussed more fully below). If there is no unconfirmed rendezvous, the next step is writing an indication of the uncooperative nature of the user program, along with the current retired instruction counter (RIC) value, to the synchronization registers 54 in the voter logic 56 (block 410). Thereafter, the uncooperative process handler routine waits in a software loop on the voter logic to return the synchronization data (block 412).

Because in accordance with some embodiments only one exchange of data may be in progress at any one time, if there is an attempt to schedule a rendezvous point that has yet to complete at the expiration of the uncooperative process timer (again block 408), an unconfirmed rendezvous, the next step is waiting in a software loop (block 422) until the voter logic writes the synchronization data. Keeping in mind that the synchronization data written back is with regard to a previous interrupt (not the uncooperative process timer expiration interrupt that triggered the current execution of the uncooperative process handler routine), the returned data is used for rendezvous point scheduling (block 424). For more information on rendezvous point scheduling, reference may be made to the U.S. patent application no. (HP Ref. 200316143-1 (CR Ref. 2162-22100)) titled, "Method and System of Loosely Lock-Stepped Non-Deterministic Processors." After rendezvous point scheduling (block 424), the process proceeds to writing an indication of the uncooperative nature of the user program, along with the current retired instruction counter value, to the synchronization registers 54 in the voter logic 56 (block 410), and waits in a software loop for return of the data (block 412).

If the processors do not agree that the user program is uncooperative (block 414), an analysis of the returned data is made to determined if the user program is cooperative in other processors (block 416). For example, while the uncooperative process timer in one processor may expire just prior to a system call by the user program, the user program in a second processor of the logical process may make the system call just before expiration. Thus, one processor indicates that the process is uncooperative, and the second processor attempts to schedule a rendezvous point to handle the next interrupt, including the writing of a proposed rendezvous point. If the analysis reveals the user program will soon make a system call (block 416), the uncooperative process timer is reset (block 417), the current system call number is saved (block 419), interrupts are enabled (block 418), and the process returns (block 420) so that the user program can continue execution, soon to be cooperative again.

Still referring to FIG. 4, if all the processors of the logical processor agree that the user program is uncooperative (block 414), then the process of aligning the various copies of the user program begins by the processor executing forward in the user program until its retired instruction counter is the same as the highest retired instruction counter of the processors (block 426) (each processor knows the retired instruction counter value because that information is exchanged, along with an indication of the uncooperative nature of the respective programs, at block 410). In some cases, the processor in which the illustrative uncooperative process handler of FIG. 4 is operating will have the highest retired instruction counter, and thus the user program is at the proper point. Executing forward to the highest retired instruction counter value may take many forms. If the current processor's retired instruction counter value is well behind the highest retired instruction counter value, then a timer may be started and the user program may be allowed to run during the active time of the timer. Either alternatively to allowing the user program to execute for a timer period, or after a timer has been used to get the retired instruction counter close to the highest retired instruction counter value, the processor may be placed in a single instruction mode, where the user program is single-stepped until the retired instruction counter matches the highest retired instruction counter value.

Although after completing block 426 of illustrative FIG. 4 all the processors of a logical processor are at the same retired instruction counter value, there is no guarantee that the user programs are actually at the same execution point in the instruction stream for the reasons discussed in the Background section. Thus, the next steps are executing a plurality of instructions, decoding at least some of the instructions, and determining the inputs of the decoded instructions (block 430). The decoding referenced with respect to FIG. 4 (and in the more specific implementations of FIGS. 5, 7 and 9) is a program-based decoding not to be confused with hardware-based decoding performed by a processor in preparation to execute an instruction. In alternative embodiments, processors may be specifically designed for loose lock-step operation, and thus may pass decoded information to the software by way of registers of the processor, or the processors may have a second hardware based decode unit that decodes the instructions and passes decoded information to software. Consider, for example, an instruction of a user program being an OR operation. The decoding (whether software are specially designed hardware) decodes the machine language instruction to determine that it was an OR operation executed, and further determines the values the input registers that the instruction used to perform its function. The executing and decoding may take place in any order, or substantially simultaneously. Addresses of at least some of the decoded instructions and values indicative of the inputs of at least some of the decoded instructions are exchanged among the processors (block 432). In accordance with at least some embodiments of the invention, the exchange of the addresses of decoded instructions and values indicative of the inputs of the decoded instructions takes place by writing that information to the synchronization registers 54, and the voter logic 56 returns the information in a manner similar to the exchange of the indication of the uncooperative process and retired instruction counter values.

Once a processor has obtained the addresses of the decoded instructions and values indicative of the inputs of instructions from other processors, the processor in which the illustrative method of FIG. 4 is implemented then pattern matches the addresses of the exchanged instructions (block 434). By finding matching patterns of addresses (and therefore instructions) and values indicative of the inputs, each processor determines its execution point in relation to other processors within the logical processor. The next step is a determination of whether the processor in which the illustrative method of FIG. 4 is implemented lags in execution point of the user program (block 436). If the processor lags, the processor executes forward in the user program until the execution point matches the most advanced execution point of the user program in the processors of the logical processor (block 438).

In accordance with at least some embodiments, forcing alignment when each processor agrees to the uncooperative nature of a user program alone may be sufficient to ensure proper operation in spite of a user program's uncooperative nature. In further embodiments, each processor plants a system call in the user program (block 440) to ensure that at least the portion of the user program that caused the uncooperative process designation does not do so again. In some embodiments, the offending portion of the user program (most likely a software loop) is modified to contain a system call. This is accomplished, for example, by replacing no-operation instructions (NOPs) with system calls (e.g., a time of day call). If the user program instruction stream does not allow for mere replacement, an instruction is replaced with a branch instruction that points to the replaced instruction, a system call, and a return branch instruction. These modifications may be made to the user program as it exists in the main memory and/or made to the user program as it exists on a long term storage device, such as a disk drive. In yet further alternative embodiments, processor hardware may support a mechanism for insertion of an interrupt at a particular point in the instruction stream, and the interrupt triggers the system call for interrupt scheduling. For example, the Itanium® processor family supports registers within the processor known as "instruction breakpoint registers." The breakpoint registers may be loaded with an instruction pointer value, and when the actual instruction pointer matches value in the breakpoint register, an interrupt is triggered. This exemplary mechanism is used to trigger an interrupt, which in turn triggers a system call for synchronization purposes. The hardware based mechanism may not be available in all architectures, but the embodiments of modifying the user program may have universal application. Thereafter, the uncooperative process timer is reset (block 417), the current system call number is saved (block 419), interrupts are enabled (block 418) and the interrupt handler returns (block 420).

Still referring to FIG. 4, the group of steps within the dashed line 428, being decoding (block 430), exchanging addresses of decoded instructions (block 432) and pattern matching (block 434), are a high level overview of several alternative embodiments that may be used to determine execution point relative to the execution points of other processors within the logical processor. This specification presents three alternative embodiments that a processor may use to determine its relative execution point, and each of these will be discussed in turn.

Figure 5:
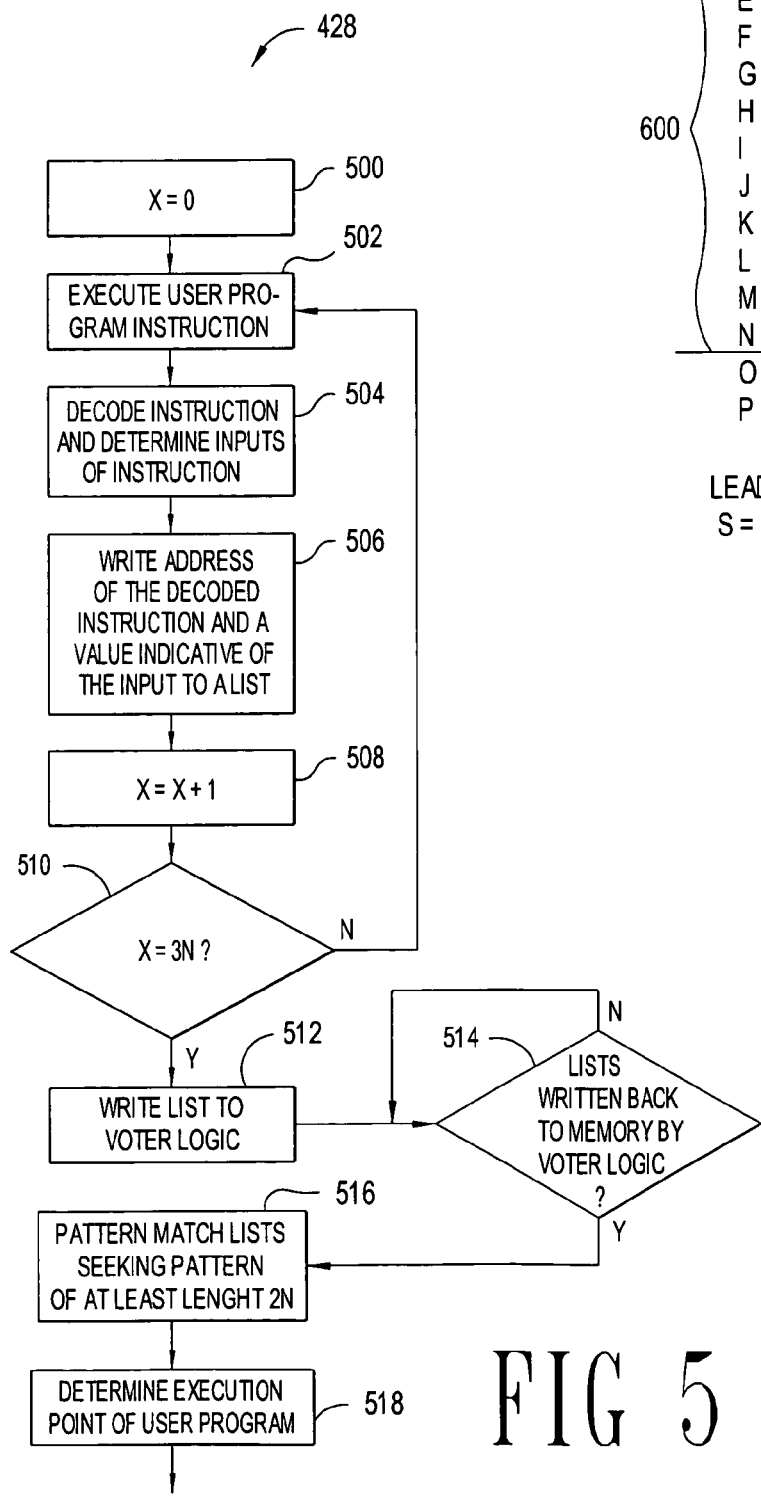
FIG. 5 illustrates a first alternative method of determining the execution points.

FIG. 5 illustrates a first of the alternative embodiments that may be used by a processor to determine its relative execution point. The illustrative method steps of FIG. 5 replace the three high level descriptions within the dashed line 428 of FIG. 4. The process starts by zeroing a counting parameter (block 500). The next step is the execution of a single user program instruction (block 502). Executing a single user program instruction may be accomplished by placing the processor in which the illustrative method of FIG. 5 is implemented into a single step mode and executing a single instruction. The instruction is decoded (either before or after execution by the processor) and the inputs of the instruction are determined (block 504). The illustrative step of block 504 is a software decoding process not to be confused with the decoding of the user instruction performed by the processor to implement the illustrative executing (of block 502). For example, if the user program executed is a logical AND operation, then the illustrative method of FIG. 5 decodes the machine language instruction to determine that it was an AND operation, and further determines the values the input registers that the instruction used to perform its function. Thereafter, the address of the decoded instruction and a value indicative of the inputs are written to a list (block 506), and the counting parameter is incremented (block 508). The illustrative steps of decoding the instructions (block 504) and writing addresses of each decoded instruction (and related information) to a list (block 506) are repeated for a predetermined number iterations (block 510). The predetermined number of iterations for these embodiments is designated as "3N" in the figure. The value of N may be determined by testing on a particular brand and model of processor and represents at least the maximum error in retired instruction counter values as between processors presented the same instruction stream and executing the instruction stream for the same amount of time. Stated otherwise, the value of N is the maximum difference in number of instructions between execution points of the processors when their retired instruction counters (zeroed when the user program is dispatched) are equal. In some embodiments, to have a margin of error, the value of N may be a plurality of multiples of the maximum error, and in some cases the value of N is selected to be 1,000 even if the maximum error is less than 1,000, for example. In the illustrative case of FIG. 5, and in cases where the precise value of N is used rather than N that includes a margin of error, decoded values for at least 3N instructions should be exchanged to ensure a match correctly identifies the leader and the number of instructions by which the leader leads. Exchanging decoded values for more than 3N instructions (or for where N is intentionally selected to be greater than the true N) is within the scope and spirit of the invention.

Still referring to FIG. 5, as illustrated by the decision block 510, the executing, decoding and writing decoded values to a list is completed for at least three times the maximum error of the retired instruction counter values. The next step is to write the created list to the voter logic (block 512), and to wait in a software loop (block 514) until the voter logic writes similar information from the other processors in the logical processor back to the memory, e.g., location 57 of the processor in which the illustrative method of FIG. 5 is implemented. Once a processor has the list from other processors in the logical processor, the processor performs a pattern match of the lists seeking patterns having a length of at least two times the maximum error of the retired instruction counter values (block 516). Once a match is found, the processor then determines its execution point in the user program relative to the other processors in the logical processor (block 518). Thereafter, the process resumes with the illustrative determination of whether the processor in which the illustrative method is implemented lags (block 436 of FIG. 4).

Figure 6:
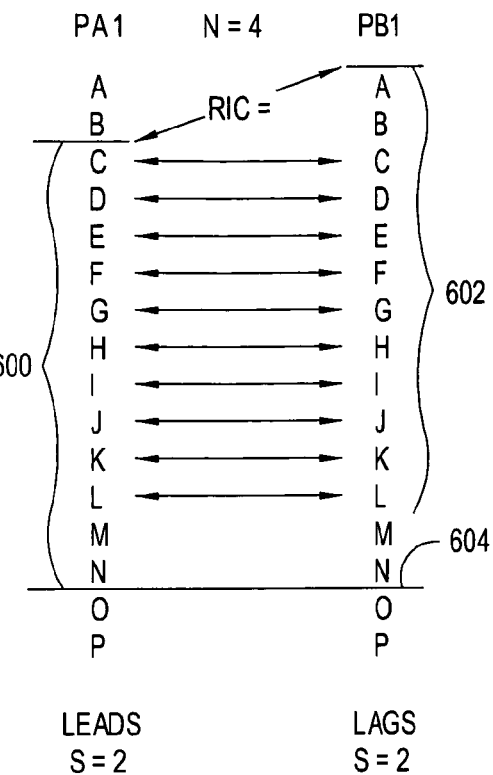
FIG. 6 illustrates the method of FIG. 5.

FIG. 6 shows a plurality of instructions {A, B, . . . P} for two processors, PA1 and PB1, to further illustrate the concepts of FIGS. 4 and 5. The explanation is equally applicable to three processors, but two are used so as not to unduly complicate the description. In particular, consider that each user program has been determined to be uncooperative and that one of the processors has executed forward until their retired instruction counter values are equal ("RIC="). Because of inaccuracies in counting retired instructions, the next instruction to be executed in the user program of processor PA1 is instruction C, while the next instruction to be executed in processor PB1 is instruction A. Thus, processor PA1 leads processor PB1 in execution point by two user program instructions. Stated otherwise, the skew in this situation is two. Further consider that the maximum error of the retired instruction counter values across a number of instructions encountered during an average time slice for the user program is determined, possibly through empirical testing, to be four.

In this illustrative case, the value of N may be four or greater, and for this example N is exactly four. Thus, each user program is allowed to step forward in this illustrative case twelve user program instructions while each processor makes a list of addresses of decoded instructions and values indicative of the inputs to the decoded instructions (blocks 500-510 of FIG. 5). Once complete, processor PA1 has a list 600 comprising twelve entries {C, D, . . . N}. Likewise, processor PB1 has a list 602 comprising {A, B . . . L}. Thereafter, the lists are exchanged between the processors (blocks 512 and 514 of FIG. 5) and each processor performs a pattern match as between the list it creates and the list or lists obtained from other processors to determine the relative execution point (blocks 516 and 518 of FIG. 5). In the illustrative case of FIG. 6, each processor finds a pattern match comprising {C, D, . . . L}. Thus, ten instructions are found to match, and this exceeds the minimum pattern match length of two times the maximum error of the retired instruction counter values (2N). In this example, processor PA1 determines that it leads and the skew in execution point as between the processors is two (S=2) (block 518 of FIG. 5). Likewise, processor PB1 determines that it lags and that the skew in this illustrative case is two (block 518 of FIG. 5). Thus, the next step is for the lagging processor, in this case PB1, to execute forward by the amount of the skew (block 438 of FIG. 4), and after this step each of the processors are aligned, with the next instruction to be executed in each user program being O, as illustrated by line 604. Thus, alignment of the illustrative two processors is complete, and it is now safe to dispatch other programs which may share memory with the user program without the possibility of the additional programs seeing non-duplicative memory and without having to copy memory page data between processors.

Referring again briefly to FIG. 5, the illustrative step of writing the decoded instruction and a value indicative of the inputs to a list (block 506) may take many forms. In some embodiments, the decoded instruction and the actual inputs themselves may be written to the list. In order to reduce the amount of data that is exchanged between the processors, alternative embodiments send a signature or reduced representation of the value of the inputs. For example, each processor may calculate a cyclic redundancy check sum of the inputs, and this check sum may be the value written to the list in exchange with other processors. Any strong check sum generator may be used, such as cyclic redundancy check code or a 64-bit modified Fletcher check sum.

Still referring to FIG. 5, yet further alternative embodiments reduce the amount of data exchanged between the processors by decoding and exchanging less than all the instructions in the 3N executed instructions. More particularly, some embodiments of the invention exchange only addresses of predetermined match point instructions within the user program. In these embodiments, either values of all the inputs are exchanged, or the data set may be further reduced by exchanging a cyclic redundancy check value calculated using values of inputs to all instructions. For example, in some embodiments the match points may be substantially only addresses of branch instructions, along with addresses of the first instruction and the last instruction in the 3N executed instructions. In the illustrative embodiments where branch instructions are the match points, each processor searches for a match having length of at least 2N, but instructions between matching branch instructions are counted and are assumed to be the same. However, inputs to the those instructions are included when calculating the cyclic redundancy check values. In yet further alternative embodiments, the match points are instructions having periodic instruction pointer values, e.g., instruction pointer (IP)=0 mod M (where M is any arbitrary number, e.g., 10, 20, 30).

In the embodiments illustrated by FIGS. 5 and 6, it is not known until the pattern matching phase which processor leads and which processor(s) lag, and thus executing three times the maximum error of the retired instruction counter values may be needed to ensure that the leader is properly identified. However, it is desirable to reduce the amount of data exchanged between the processors, and if it is known after alignment of the retired instruction counter values (block 426 of FIG. 4) which processor leads in execution point of the user program, the number of instructions executed, decoded and exchanged, as well as the length of the pattern match, may be reduced.

FIG. 7 illustrates alternative embodiments of the steps that may be implemented within the dashed line 428 of FIG. 4 where the number of user program instructions executed, decoded and addresses exchanged is reduced. In particular, upon aligning the retired instruction counter values (block 426 of FIG. 4), the various processors of the logical processor are not aware of which processor leads in execution point; however, because the maximum possible error in retired instruction count values is known (or assumed sufficiently large to cover the actual maximum possible error), a leader may be forced by selecting one processor to execute forward N instructions. Thus, the first step of the illustrative method of FIG. 7 selecting a forced leader processor (block 700). The processor selected as forced leader need not necessarily be the processor that is actually ahead in execution point, and in fact the selection of the forced leader may be arbitrary. Selecting a forced leader may involve selecting a processor with the lowest or highest processor identification number (assigned as a processors is booted), for example. In other embodiments, selecting a forced leader involves the exchange of information through the voter logic, such as writing to registers 54, and the voter logic returning data supplied from each processor to all the processors. For example, one selection method is to have each processor generate a random number, and the processor with the highest random number (determined after the exchange of numbers) is the forced leader. Other methods may be equivalently used.

The next step is a determination of whether the processor in which the illustrative method of FIG. 7 is running is the forced leader (block 702). If the processor in which the illustrative method is running is the forced leader, then the processor executes forward in the user program a number of instructions being at least equal to the maximum error of the retired instruction counter values (block 704). It is not necessary to decode and/or record any of the instructions in this particular step. Regardless of whether the forced leader was actually leading or lagging in execution point, after executing forward the maximum error of the retired instruction counter values, the processor that performs this step will be the leader (or tied for leader) in execution point of the user program.

Still referring to FIG. 7, the next steps for each processor are to zero a counting parameter (block 706) and to execute a single user program instruction (block 707). Thereafter, the instruction executed by the processor is decoded and the inputs of the instruction determined (block 708). Alternatively, the decoding may take place prior to the executing, or substantially simultaneously. The address of the decoded instruction and a value indicative of the inputs are written to a list (block 710), and the counting parameter is incremented (block 712). Much like the illustrative method of FIG. 5, the illustrative steps of decoding the instructions (block 708) and writing addresses of each decoded instruction (and related information) to a list (block 710) are repeated for a predetermined number iterations (block 714). Unlike the illustrative method of FIG. 5, however, in the method of FIG. 7 the predetermined number of iterations is twice the maximum error of the retired instruction counters, designated as "2N" in the figure. In the illustrative case of FIG. 7, and in cases where the precise value of N is used rather than N that includes a margin of error, decoded values for at least 2N instructions should be exchanged to ensure a match correctly identifies the leader and the number of instructions by which the leader leads. However, exchanging decoded values for more than 2N instructions (or for where N is intentionally selected to be greater than the true N) is within the scope and spirit of the invention.

Still referring to FIG. 7, the next step is to write the list created to the voter logic (block 716), and to wait in a software loop (block 718) until the voter logic writes similar information from the other processors in the logical processor back to the memory, e.g., location 57 of the processor in which the illustrative method of FIG. 7 is implemented. Once a processor has the list from other processors in the logical processor, the processor performs a pattern match of the list seeking a pattern having at least one matching addresses (one matching instruction), or in some cases no match at all (block 720). Once a match of at least one instruction is found, or no match is found, the processor then determines its execution point in the user program relative to the forced leader (block 722). Thereafter, the process resumes with the determination of whether the processor in which the method is implemented lags (block 436 of FIG. 4). There is a distinction in operation of FIG. 7 that should be realized regarding a processor's label of leading or lagging. Though a processor's execution point may lag when retired instruction counter values are forced to be equal (block 426 of FIG. 4), if the originally lagging processor is selected as forced leader and advanced N instructions (blocks 700-704), then after pattern matching the forced leader will lead in execution point, and the other processor(s) will advance (blocks 436 and 438 of FIG. 4). By contrast, if a processor's execution point lags after forcing the retired instruction counter values to be the equal, and the processor is not selected as forced leader, once the execution of 2N instructions, decoding, exchanging and pattern matching is complete, the processor will lag even further.

Figure 8A:
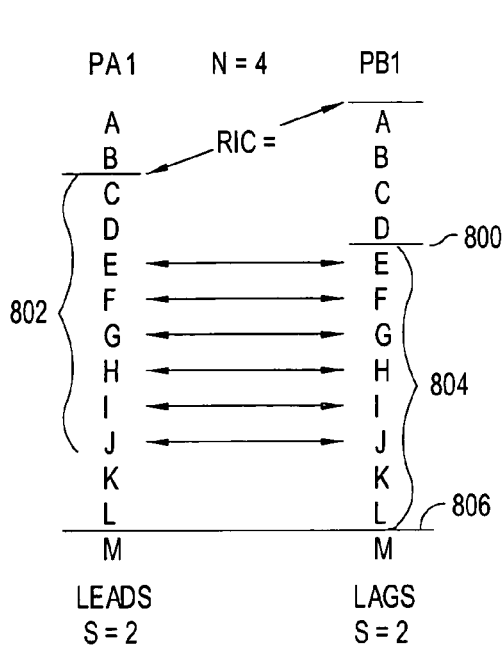
FIGS. 8A and 8B illustrate the methods of FIG. 7.

FIG. 8A shows a plurality of instructions {A, B, . . . M} for two processors, PA1 and PB1, to further illustrate the concepts of FIGS. 4 and 7. The explanation is equally applicable to three processors, but two are used so as not to unduly complicate the description. In particular, consider that each user program has been determined to be uncooperative and that one of the processors has executed forward until their retired instruction counter values are equal ("RIC="). Because of inaccuracies in counting retired instructions, the next instruction to be executed in the user program of processor PA1 is instruction C, while the next instruction to be executed in processor PB1 is instruction A. Thus, processor PA1 leads processor PB1 in execution point by two user program instructions. Further consider that the maximum error of the retired instruction counter values across a number of instructions encountered during an average time slice for the user program is determined, possibly through empirical testing, to be four.

In the illustrative case of FIG. 8A, the value of N may be four or greater, and for this example N is exactly four. Processor PB1 is arbitrarily chosen as forced leader (block 700 of FIG. 7), and therefore steps forward N instructions of the user program (block 704 of FIG. 7). Thereafter, each user program is allowed to step forward, in this illustrative case, eight user program instructions (2N) while each processor makes a list of addresses of decoded instructions and a value indicative of the inputs to the decoded instructions (blocks 706-714 of FIG. 7). Once complete, processor PA1 has a list 804 comprising eight entries {C, D, . . . J}. Likewise, processor PB1 has a list 804 comprising entries {E, F . . . L}. Thereafter, the lists are exchanged between the processors (blocks 716 and 718 of FIG. 7) and each processor performs a pattern match as between the list it creates and the list or lists obtained from other processors to determine the relative execution point (blocks 720 and 722 of FIG. 7). In FIG. 8A, each processor finds a pattern match comprising {E, F . . . J}. In this example, processor PA1 determines that it now lags and the skew in execution point as between the processors is two (S=2) (block 722 of FIG. 7). Likewise, processor PB1 determines that it now leads and that the skew in this illustrative case is two (again block 722 of FIG. 7) (FIG. 8A notes that processor PA1 initially led by two). Thus, the next step is for the lagging processor, in this case PA1 (and in spite of the fact PA1 was leading after forcing the retired instruction counter values equal), to execute forward by two instructions (block 438 of FIG. 4), and after this step each of the processors are aligned, with the next instruction to be executed in each user program being M, as illustrated by line 806. Thus, alignment of the illustrative two processors is complete, and it is now safe to dispatch other programs which may share memory with the user program without the possibility of the additional programs seeing non-duplicative memory.

Figure 8B:
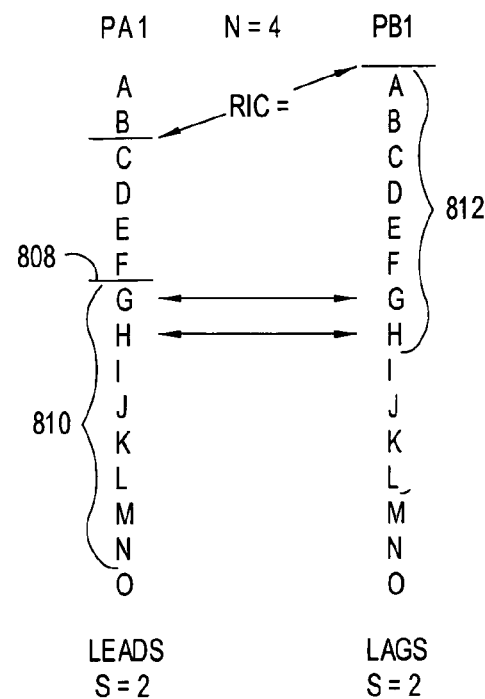

FIG. 8B shows the same situation as FIG. 8A, except that the leading processor after forcing retired instruction counters equal, PA1, is selected as the forced leader. Thus, processor PA1 steps forward N instructions of the user program (block 704 of FIG. 7), making the first decoded instruction of PA1 (block 708 of FIG. 7) instruction G. Thereafter, each user program is allowed to step forward eight user program instructions (2N) while each processor makes a list of addresses of decoded instructions and values indicative of the inputs to the decoded instructions (blocks 706-714 of FIG. 7). Once complete, processor PA1 has a list 810 comprising eight entries {G, H, . . . N}. Likewise, processor PB1 has a list 812 comprising entries {A, B, . . . H}. Thereafter, the lists are exchanged between the processors (blocks 716 and 718 of FIG. 7) and each processor performs a pattern match as between the list it creates and the list or lists obtained from other processors to determine the relative execution point (blocks 720 and 722 of FIG. 7). In FIG. 8B, each processor finds a pattern match comprising {G,H}. In this example, processor PB1 determines that it lags (by six instructions) and the skew in execution point as between the processors is two (S=2) (block 722 of FIG. 7). Stated otherwise, the original skew as between the processors was two, but after executing the forced leader forward N instructions the skew is six instructions. Likewise, processor PA1 determines that it leads (by six instructions) and that the skew in this illustrative case is two (again block 722 of FIG. 7). Again, the original skew as between the processors was two, but after executing the forced leader forward N instructions the skew is six instructions. Thus, the next step is for the lagging processor, in this case PB1, to execute forward by six instructions (block 438 of FIG. 4), and after this step each of the processors are aligned.

For situations analyzed using the illustrative method of FIG. 7, if the skew between processors is equal to N, and we happen to choose the true leader to be forced leader, the forced leader leads by 2N. Once each processor advances by 2N instructions, the leading processor is still ahead by 2N instructions, and thus there will be no match found in the pattern matching (block 720 of FIG. 7). In this case, the processor in which the illustrative method of FIG. 7 operates knows that the original skew was N, but the lagging processor now lags by 2N instructions. Still with reference to the method of FIG. 7, in situations where the skew is one (S=1), there will be only a single matching instruction as between the exchanged lists. Given the knowledge however that the forced leader is indeed the leader, a single instruction is sufficient to identify the execution point as between the processors. Further confidence in this assessment may be gained from the fact that the matching instruction will be at the very beginning of the list of the forced leader, and at the very end of the list of the non-forced leader(s).

Figure 9:
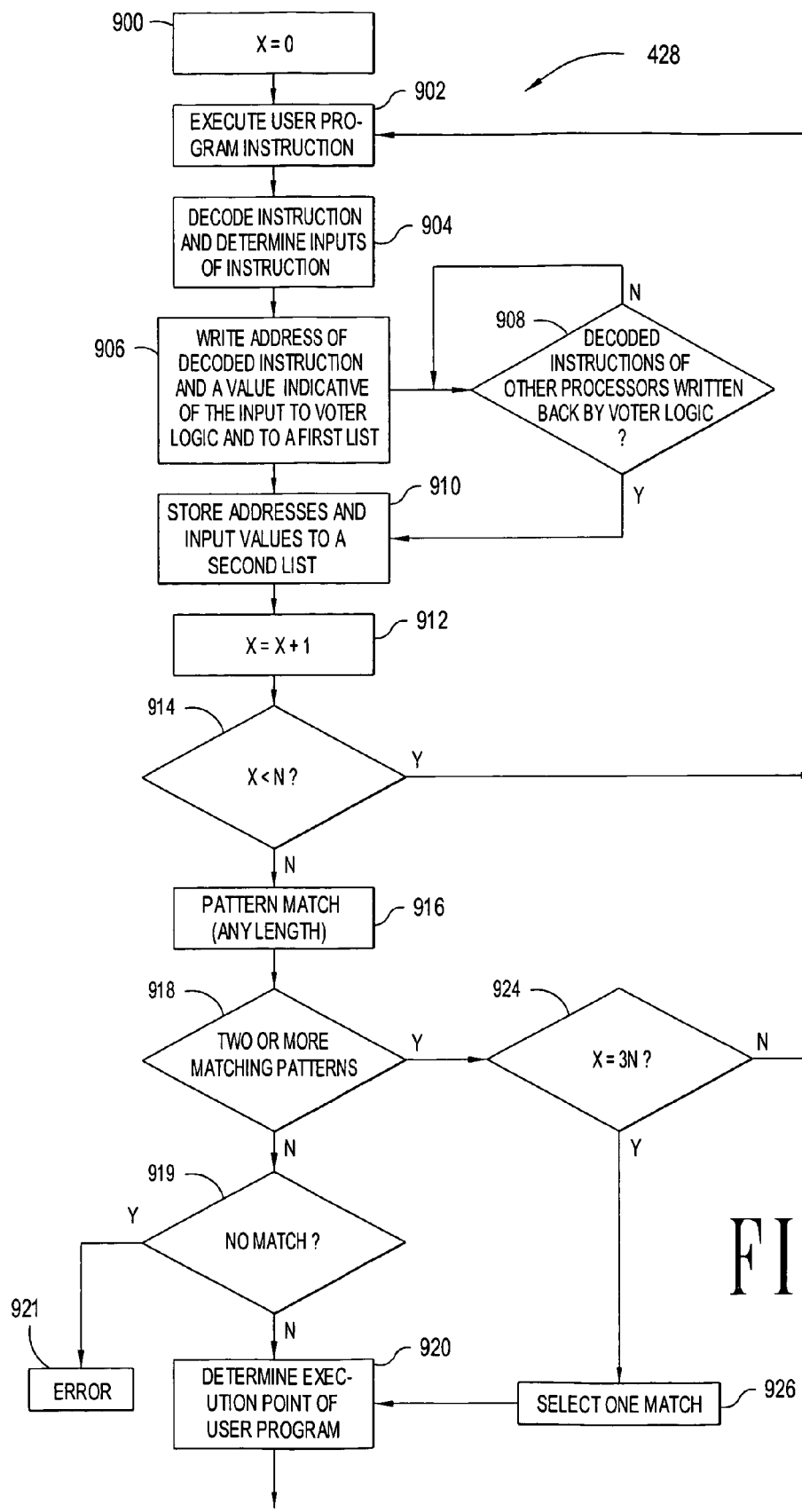
FIG. 9 illustrates yet further alternative embodiments of determining the execution points.

FIG. 9 illustrates yet further alternative embodiments of the steps that may be implemented within the dashed line 28 of FIG. 4 where the number of user program instructions executed, decoded and addresses exchanged is reduced. In particular, upon aligning the retired instruction counter values (block 426 of FIG. 4), the next steps for each processor are to zero a counting parameter (block 900) and to execute a single user program instruction (block 902). Thereafter, the instruction executed by the processor is decoded and the inputs of the instruction determined (block 904). The decoding of block 904, though shown after executing, may take place before executing, or substantially simultaneously with executing. The address of decoded instruction and a value indicative of the inputs of the decoded instruction are written to a list (block 906) and also written to the voter logic (again block 906), thus exchanging the instruction soon after it is decoded. The illustrative method then waits in a software loop (block 908) on the return of addresses and values indicative of the inputs of the decoded instructions from other processors. After the data is written back from the voter logic, the addresses and input values are stored to a second list (block 910), and the counting parameter is incremented (block 912). The illustrative steps of decoding the instructions (block 904) and writing addresses of each decoded instruction (and related information) to a list and to the voter logic (block 906) are repeated for a predetermined number iterations (block 914). In contrast to the illustrative methods of FIGS. 5 and 7, the predetermined number of iterations is only at least the maximum error of the retired instruction counter values, designated as "N" in the figure. In the illustrative case of FIG. 9, and in cases where the precise value of N is used rather than N that includes a margin of error, decoded values for at least N instructions should be exchanged to ensure a match correctly identifies the leader and the number of instructions by which the leader leads. However, exchanging decoded values for more than N instructions (or for where N is intentionally selected to be greater than the true N) is within the scope and spirit of the invention.

Still referring to FIG. 9, after executing and decoding N instructions of the user program, the illustrative method performs a pattern match on the instructions from the list internally generated and the list of addresses of decoded instructions (and values indicative of inputs) provided by other processors in of the logical processor (block 916). If two or more matches are found (block 918) and the illustrative process has executed less than 3N instructions of the user program (block 924), the process executes a further user program instruction. If two or more matching patterns are found, a leader as between the processors cannot be determined, and thus further instructions with which to compare are needed. If, on the other hand, only one match is found (of any length, including the match of a single instruction (and inputs)) (blocks 918 and 919), the next step is to determine the execution point (block 920) and thereafter the process resumes with the illustrative determination of whether the processor in which the illustrative method is implemented lags (block 436 of FIG. 4). If no matches are found (block 919), this is an error case (block 921) indicating that the value if N was incorrect. If two or more matches are found (block 918), but 3N instructions have been executed, the decoded instructions contain an idempotent loop (a loop whose iteration is not distinguishable based on instructions and inputs to the instructions), and one match is arbitrarily selected (block 926) and the execution points are determined relative to the selected match (block 920). Stated otherwise, if 3N instructions have been executed and there are still two or more matches, any one of the matches is selected and the execution points are forced equal.

Thus, the illustrative method of FIG. 9 may be able to ascertain the relative execution point with the decoding and exchanging of addresses of only N instructions (if the skew S=0). In the general case, implementing the illustrative method of FIG. 9 each processor need only execute at most N+2S instructions to ascertain the execution point of their respective user programs. Thus, the method of FIG. 9 has an advantage over the illustrative methods of FIGS. 5 and 7 when the skew is low. In the limit as skew approaches N, the method of FIG. 9 degenerates to the exchange of 3N decoded instructions, the same as the method of FIG. 5.

Figure 10A:
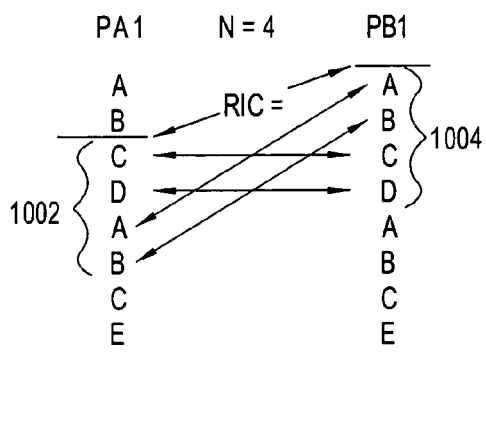
FIGS. 10A and 10B illustrate the method of FIG. 9.

FIG. 10A shows a plurality of instructions {A, B, ... E} for two processors, PA1 and PB1, to further illustrate the concepts of FIGS. 4 and 9. Notice how in this case the illustrative instructions represent two iterations of a loop. In particular, consider that each copy of the user program (or processor) has been determined to be uncooperative and that one of the processors has executed forward until their retired instruction counter values are equal ("RIC="). Because of inaccuracies in counting retired instructions, the next instruction to be executed in the user program of processor PA1 is instruction C, while the next instruction to be executed in processor PB1 is instruction A. Thus, processor PA1 leads processor PB1 in execution point by two user program instructions. Further consider that the maximum error of the retired instruction counter values in this case is four.

In the illustrative case of FIG. 10A, the value of N may be four or greater, and for this example N is exactly four. Each user program is allowed to step forward at least four user program instructions while each processor makes a list of addresses of decoded instructions (and values indicative of the inputs to decoded instructions) and exchanges the list (blocks 900-914 of FIG. 9). Once decoding of N instructions is complete, processor PA1 has a list 1002 comprising four entries {C, D, A, B}. Likewise, processor PB1 has a list 1004 comprising entries {A, B, C, D}. Because in these embodiments the addresses of decoded instructions (and values indicative of the inputs of the decoded instructions) are exchanged after each decoding, (blocks 906 and 908 of FIG. 9), each processor also has a list from other processors in the logical processor. Thus, each processor performs a pattern match as between the list it creates and the list or lists obtained from other processors (blocks 916 of FIG. 9). In the illustrative case of FIG. 10A, however, each processor finds two matching patterns being {C, D} and {A, B} (block 918). Thus, the execution point as between the two processors cannot be determined, and because in this example only N instructions have been executed and decoded, the process returns to execute and decode an additional user program instruction.

Figure 10B:
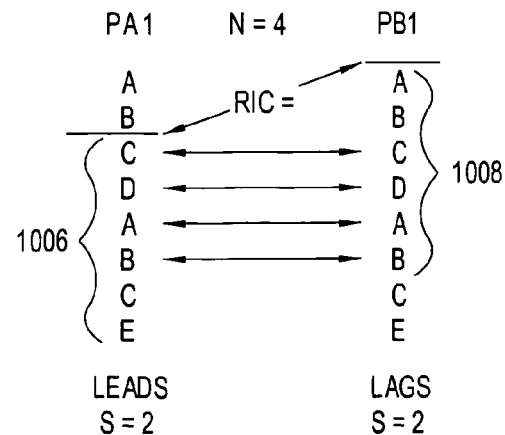

FIG. 10B illustrates the situation of FIG. 10A after executing and decoding of two additional user program instruction (because stepping forward only one additional user program instruction still leaves two matching patterns of equal length). In particular, after executing the two additional user program instructions processor PA1 has a list 1006 comprising six entries {C, D, A, B, C, E}. Likewise, processor PB1 has a list 1008 comprising entries {A, B, C, D, A, B}. A pattern match in this illustrative case reveals one matching pattern having a length four instructions {C, D, A, B}. Because only one matching pattern of length four is found (block 918 of FIG. 9), the relative execution points of the user programs may be determined (block 920). Thus, the next step is for the lagging processor, in this case PB1 to execute forward by two instructions (block 438 of FIG. 4), and after this step each of the processors are aligned.

Figure 11:
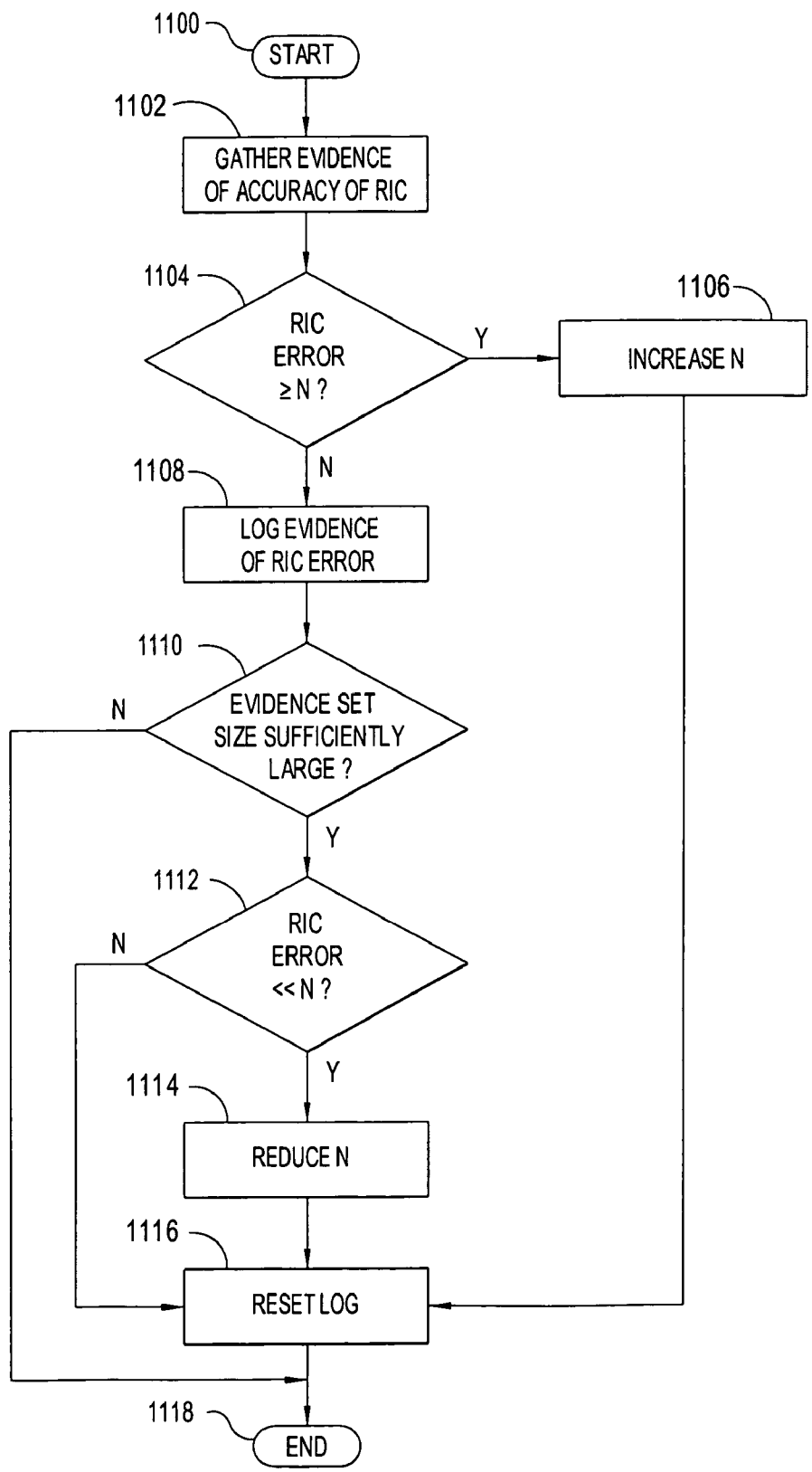
FIG. 11 is an illustrative flow diagram of adaptively adjusting the value of N used in accordance with embodiments of the invention.

The embodiments described to this point has assumed a static, and previously determined, value of N. In alternative embodiments, the value of N is adaptively changed. FIG. 11 illustrates a flow diagram of an algorithm to implement adaptive changes to the value of N. The illustrative method of FIG. 11 may be implemented as a stand-alone process, or may be incorporated within the method of FIG. 4. The process starts (block 1100) and moves to gathering evidence of the accuracy of the retired instruction counter (block 1102). In some embodiments, the values of the instruction pointers as between the processors are compared when the retired instruction counter values are equal. For example, if instruction pointers are the same when retired instruction counter values are equal, then this is indirect evidence of no error in the retired instruction counter. Thus, these embodiments require the exchange of the instruction pointers after stepping forward to the highest retired instruction counter value, such as by exchanging the instruction pointers using the synchronization logic. In some embodiments, direct evidence of the accuracy of N may be determined. For example, in the embodiments illustrated by FIG. 7, after pattern matching, if no match is found this is direct evidence that the value of N was precisely equal to the skew. In FIG. 9, if no match is found (block 919), this is direct evidence that the value of N is incorrect (too low).

Regardless of the precise mechanism of gathering direct or indirect evidence of the accuracy of the retired instruction counter, the next step is a determination of whether the evidence indicates the error of the retired instruction is equal to or greater than the value of N (block 1104). If so, the value of N should be adjusted (block 1106), and the evidence log reset (block 1116) (discussed more below). Increasing, or decreasing, the value of N could be completed by each processor without consultation of other processors, or the decision to increase the value of N could invoke an exchange of data by the processors to agree on the precise value of the change.

If the evidence does not suggest that the accuracy of the retired instruction counter is greater than N, then the next step is logging gathered evidence (block 1108). Thus, while increasing the value of N should be done even if one instance of gathered evidence shows the error of the retired instruction counter could be greater than N (blocks 1104 and 1106) (because in this instance it is possible that the duplicate copies of the user program are not being correctly aligned), lowering the value of N is made based on a large set of evidence. If the size of the evidence set is insufficiently large (block 1110), the process ends (block 1118). If, on the other hand, the size of the evidence set is sufficiently large (block 1110), e.g., a week of data or a month of data, then a determination is made as to whether potential errors in the retired instruction counter values is much smaller than the current value of N (block 1112). For example, if the accuracy of the retired instruction counter values as between the processors is ten counts or less, but N is on the order 1000, then the value of N could be reduced (block 1114). On the other hand, if the accuracy of the retired instruction counter values as between the processors is 100 counts, and N is on the order 200, then the value of N should not be changed. In the next step, the log of evidence is reset (block 1116), and the process ends (block 1118).

The above discussion is meant to be illustrative of the principles and various embodiments of the present invention. Numerous variations and modifications will become apparent to those skilled in the art once the above disclosure is fully appreciated. For example, while it was stated that if an Itanium® processor is used that compiler-based speculative instructions may be used, the illustrative methods and systems described above do work with processor-based speculation (e.g., branch prediction speculation and instruction reordering) inasmuch as a processor-based speculation may not adversely impact a retired instruction counter. The illustrative embodiment describe each processor executing forward until their retired instruction counter values match; however, differences in retired instruction counter values when executing N instructions may be accounted for in the size of the N value. For example, if the processors have differences in retired instruction count values of 100 instructions, then the value of N may be 100 plus at least the maximum amount of error that can be expected for the retired instruction counter. It is intended that the following claims be interpreted to embrace all such variations and modifications.

What is claimed is:

1. A processor-based method comprising:
    operating duplicate copies of a user program in a first and second processor;
    decoding at least some instructions and determining inputs of each instruction decoded, the decoding substantially simultaneously with executing in each processor;
    exchanging among the processors addresses of decoded instructions and values indicative of inputs of the decoded instructions;
    determining that an execution point of the user program in the first processors lags with respect to an execution point of the user program in the second processor using at least the addresses of the decoded instructions; and
    advancing the first processor until the execution point within each user program is substantially aligned.

2. The processor-based method as defined in claim 1 wherein exchanging further comprises exchanging addresses of decoded instructions and a cyclic redundancy check value for each decoded instruction calculated using the inputs of the decoded instructions.

3. The processor-based method as defined in claim 1 wherein exchanging further comprises exchanging addresses of decoded instructions and inputs of the decoded instructions.

4. The processor-based method as defined in claim 1 wherein determining further comprises, within the first processor:
    pattern matching the exchanged addresses of the decoded instructions and values indicative of inputs of the decoded instructions; and
    determining an amount the first processor lags in execution point based on the location of a matching pattern.

5. The processor-based method as defined in claim 4 further comprising, prior to decoding:
    allowing at least one of the user programs to execute until retired instruction counter values in each processor are substantially the same; and then
    executing a number of instructions of each user program.

6. The processor-based method as defined in claim 5 further comprising:
    wherein executing further comprises executing at least three times a maximum error of the retired instruction counter values;
    wherein exchanging further comprises exchanging after executing; and
    wherein pattern matching further comprises finding a matching pattern of length at least twice the maximum error of the retired instruction counter values.

7. The processor-based method as defined in claim 5 further comprising:
    wherein prior to the executing the number of instructions the method further comprises executing forward in one of the processors a maximum error of the retired instruction counter values;
    wherein executing the number of instructions further comprises executing in each processor at least two times the maximum error of the retired instruction counter values;
    wherein exchanging further comprises exchanging after executing; and
    wherein pattern matching further comprises finding one of a matching pattern or finding no matching pattern.

8. The processor-based method as defined in claim 5 further comprising:
    wherein executing further comprises executing between and including the maximum error of the retired instruction counter values and three times a maximum error of the retired instruction counter values;
    wherein exchanging further comprises exchanging after execution of each instruction; and
    wherein pattern matching further comprises after exchanging at least some addresses decoded instructions testing for a matching pattern after each exchange and one of refraining from further executing if a single match is found, or continue executing if multiple matches are found.

9. The processor-based method as defined in claim 5 further comprising:
    gathering evidence of accuracy of retired instruction counter values; and
    adjusting the number based on the gathered evidence.

10. The processor-based method as defined in claim 9 wherein adjusting further comprises one of increasing the number if the evidence of the accuracy suggests the accuracy of the retired instruction counter values is equal to or greater than the number, or decreasing the number if the evidence of the accuracy suggests the accuracy of the retired instruction counter values is less than the number.

11. The processor-based method as defined in claim 1 wherein exchanging further comprises exchanging addresses of substantially all instructions and values indicative of inputs to all instructions.

12. The processor-based method as defined in claim 1 wherein exchanging further comprises exchanging addresses of substantially only predetermined match point instructions substantially and values indicative of inputs to the decoded instructions.

13. The processor-based method as defined in claim 12 wherein exchanging further comprises exchanging addresses of substantially only instructions having periodic instruction pointer values.

14. The processor-based method as defined in claim 12 wherein exchanging further comprises exchanging addresses of substantially only every Mth instruction after a branch instruction.

15. The processor-based method as defined in claim 1, wherein determining further comprises determining by each of the first and second processors that an execution point of the user program in the first processors lags with respect to an execution point of the user program in the second processor using at least the addresses of the decoded instructions.

16. A processor-based method comprising:
 determining by a first processor that the user program executed on the first processor has not made a system level call in a predetermined amount of time;
 determining by the first processor, using information from a second processor, whether a duplicate copy of the user program executed in the second processor has made a system level call in the predetermined amount of time;
 operating duplicate copies of the user program in the first and second processor;
 decoding at least some instructions and determining inputs of each instruction decoded, the decoding substantially simultaneously with executing in each processor;
 exchanging among the processors addresses of decoded instructions and values indicative of inputs of the decoded instructions;
 discerning that an execution point of the user program in the first processors lags with respect to an execution point of the user program in the second processor using at least the addresses of the decoded instructions; and
 advancing the first processor until the execution point within each user program is substantially aligned.

17. The processor-based method as defined in claim 16 wherein exchanging further comprises exchanging addresses of decoded instructions and values indicative of the inputs of the decoded instructions.

18. The processor-based method as defined in claim 16 wherein discerning further comprises, within the first processor:
 pattern matching the exchanged addresses of the decoded instructions and values indicative of inputs of the decoded instructions; and
 determining an amount the first processor lags in execution point based on the location of a matching pattern.

19. The processor-based method as defined in claim 18 further comprising, prior to decoding:
 allowing at least one of the user programs to execute until retired instruction counter values in each processor are substantially the same; and then
 executing a number of instructions of each user program.

20. The processor-based method as defined in claim 19 further comprising:
 wherein executing further comprises executing at least three times a maximum error of the retired instruction counter values;
 wherein exchanging further comprises exchanging after executing; and
 wherein pattern matching further comprises finding a matching pattern of length at least twice the maximum error of the retired instruction counter values.

21. The processor-based method as defined in claim 19 further comprising:
 wherein prior to the executing the number of instructions the method further comprises executing forward in one of the processors a maximum error of the retired instruction counter values;
 wherein executing the number of instructions further comprises executing in each processor at least two times the maximum error of the retired instruction counter values;
 wherein exchanging further comprises exchanging after executing; and
 wherein pattern matching further comprises finding one of a matching pattern or finding no matching pattern.

22. The processor-based method as defined in claim 19 further comprising:
 wherein executing further comprises executing between and including a maximum error of the retired instruction counter values and three times the maximum error of the retired instruction counter values;
 wherein exchanging further comprises exchanging after execution of each instruction; and
 wherein pattern matching further comprises after exchanging at least some addresses decoded instructions testing for a matching pattern after each exchange and one of refraining from further executing if a single match is found, or continue executing if multiple matches are found.

23. The processor-based method as defined in claim 16, wherein discerning further comprises discerning by each of the first and second processors that an execution point of the user program in the first processors lags with respect to an execution point of the user program in the second processor using at least the addresses of the decoded instructions.

24. A system comprising:
 a first processor operable to execute a user program, the first processor coupled to a first memory;
 said first processor is operable to execute a predetermined number of instructions of its respective user program, and operable to substantially simultaneously with the executing decode at least some instructions and determine inputs of the decoded instructions, and place addresses of the decoded instructions and values indicative of the inputs in a first list;
 a second processor operable to substantially simultaneously execute a duplicate copy of the user program, the second processor coupled to a second memory;
 said second processor is operable to execute a predetermined number of instructions of its respective user program, and operable to substantially simultaneously with the executing decode at least some instructions and determine inputs of the decoded instructions, and place addresses of the decoded instructions and values indicative of the inputs in a second list;

said first and second processor are operable to exchange lists; and said first processor is operable to match a plurality of executed instructions of its user program to a plurality of executed instructions of the user program of the second processor based on the lists and to determine a number of instructions by which the first processor lags, and the first processor is operable to execute forward until execution points of the duplicate copies of the user program are substantially the same.

25. A system comprising:

a first processor operable to execute a user program, the first processor coupled to a first memory;

a second processor operable to substantially simultaneously execute a duplicate copy of the user program, the second processor coupled to a second memory;

said first processor is operable to execute a number of instructions of its respective user program, and operable to substantially simultaneously with the executing decode at least some instructions and determine inputs of the decoded instructions, and operable to substantially simultaneously with the executing exchange addresses of the decoded instructions and inputs with the second processor;

said second processor is operable to execute a number of instructions of its respective user program, and operable to substantially simultaneously with the executing decode at least some instructions and determine inputs of the decoded instructions, and operable to substantially simultaneously with the executing exchange addresses of the decoded instructions and inputs with the first processor; and said first processor is operable to match a plurality of executed instructions of its user program to a plurality of executed instructions of the user program of the second processor to determine a number of instructions by which the first processor lags, and the first processor is operable to execute forward until execution points of the duplicate copies of the user program are substantially the same.

\* \* \* \* \*